Oct. 24, 1967 W. B. GARDNER ETAL 3,348,375
GAS TURBINE ENGINE FUEL CONTROL
Filed March 2, 1966 2 Sheets-Sheet 1

INVENTORS
WILLIAM B. GARDNER
JOEL F. KUHLBERG
PETER W. McLAUGHLIN

BY Fishman & Van Kirk
ATTORNEYS

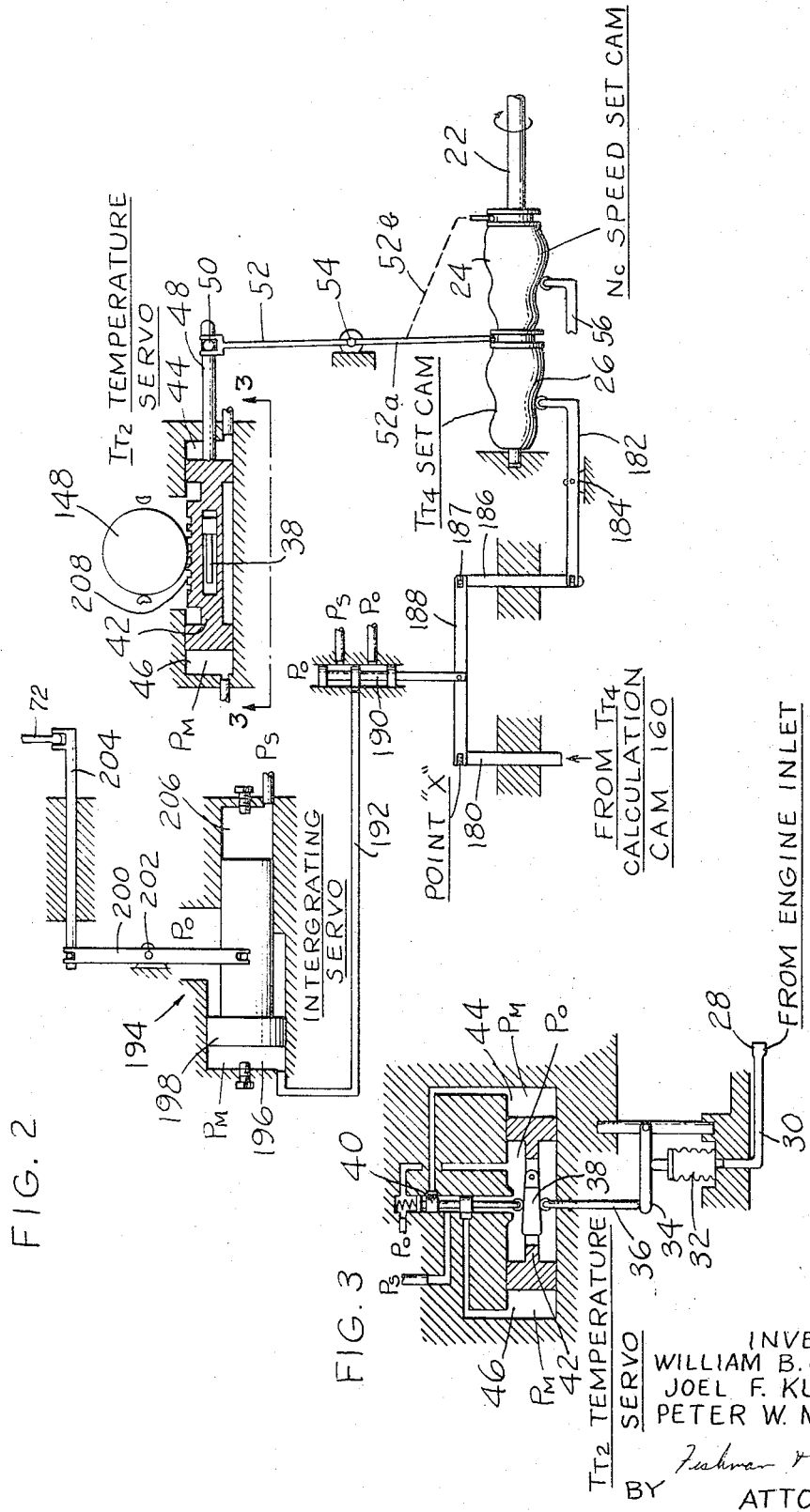

United States Patent Office

3,348,375
Patented Oct. 24, 1967

3,348,375
GAS TURBINE ENGINE FUEL CONTROL
William B. Gardner, West Simsbury, Joel F. Kuhlberg, East Hampton, and Peter W. McLaughlin, Glastonbury, Conn., assignors to United Aircraft Corporation, East Hartford, Conn., a corporation of Delaware
Filed Mar. 2, 1966, Ser. No. 531,150
10 Claims. (Cl. 60—39.28)

---

ABSTRACT OF THE DISCLOSURE

A gas turbine engine fuel control wherein actual turbine inlet temperature is compared with a selected turbine inlet temperature to regulate steady-state fuel flow, the actual turbine inlet temperature being calculated from values of fuel flow ratio (fuel flow per unit engine burner pressure) and turbine inlet temperature, and wherein engine speed and engine inlet temperature are used to set a maximum allowable turbine inlet temperature for comparison with the calculated turbine inlet temperature as an acceleration fuel flow limit.

---

This invention relates to a fuel control for a gas turbine engine. More particularly, this invention relates to a turbine inlet temperature governing fuel control for a gas turbine in which turbine inlet temperature is compared with a selected value of turbine inlet temperature for steady state fuel control, and in which a programmed maximum allowable turbine inlet temperature is used to limit turbine inlet temperature during engine acceleration.

In many prior gas turbine engine installations, spurious engine operating conditions (such as the bleeding of compressor air) not taken into account in the control of fuel flow have had undesirable effects on turbine inlet temperature. With respect to regenerative engines, heat supplied to the engine burner has required measurement of regenerator parameters in order to account for regenerator effects on turbine inlet temperature, or else regenerator effects on turbine inlet temperature have been ignored.

In the present invention a direct control on the turbine inlet temperature during steady-state engine operation is achieved through a comparison of calculated actual turbine inlet temperature with a power lever selected value of desired turbine inlet temperature to regulate fuel flow, thereby assuring accuracy in operating the engine at a desired turbine inlet temperature regardless of spurious engine operating conditions or regenerator heat added to the system. Actual turbine inlet temperature is calculated from values of fuel flow ratio (fuel flow per unit engine burner pressure) and burner inlet temperature. Engine speed and engine inlet temperature are used to set a maximum allowable turbine inlet temperature for comparison with the calculated turbine inlet temperature to override the steady state operation of the fuel control during engine acceleration.

The direct turbine inlet temperature control of the present invention results in the ability to accurately operate the engine at a desired turbine inlet temperature condition, and this ability is achieved regardless of any spurious engine conditions that might exist. In the case of a regenerative engine, heat supplied to the engine burner by the regenerator is automatically accounted for without measuring any of the regenerator parameters. Thus, although not limited to regenerative engines, the present fuel control is particularly suited for such engines. The accuracy and advantages of the steady state operation of this fuel control are also incorporated into the acceleration function of the control by comparing actual turbine inlet temperature with a permissible maximum value of turbine inlet temperature.

Accordingly, one object of this invention is to produce a novel fuel control for a gas turbnie engine in which fuel flow is regulated as a function of turbine inlet temperature.

Another object of this invention is to produce a novel fuel control for a gas turbine engine in which turbine inlet temperature is accurately controlled during steady state operation of the engine.

Another object of this invention is to produce a novel fuel control for a gas turbine engine in which acceleration limiting is accomplished by comparing actual turbine inlet temperature with a maximum permissible turbine inlet temperature.

Another object of this invention is to produce a novel fuel control for a gas turbine engine of the regenerative type in which the effects of heat added to the system by the regenerator are taken into account in the fuel metering system without actually sensing or measuring any regenerator parameters.

Other objects and advantages will be understood from the following detailed description and drawings.

In the drawings:

FIGURE 2 is a view partly along line 2—2 of FIGURE 1 and also showing additional elements of the control.

FIGURE 3 is a view partly along line 3—3 of FIGURE 2, and also showing additional elements.

Figure 1:
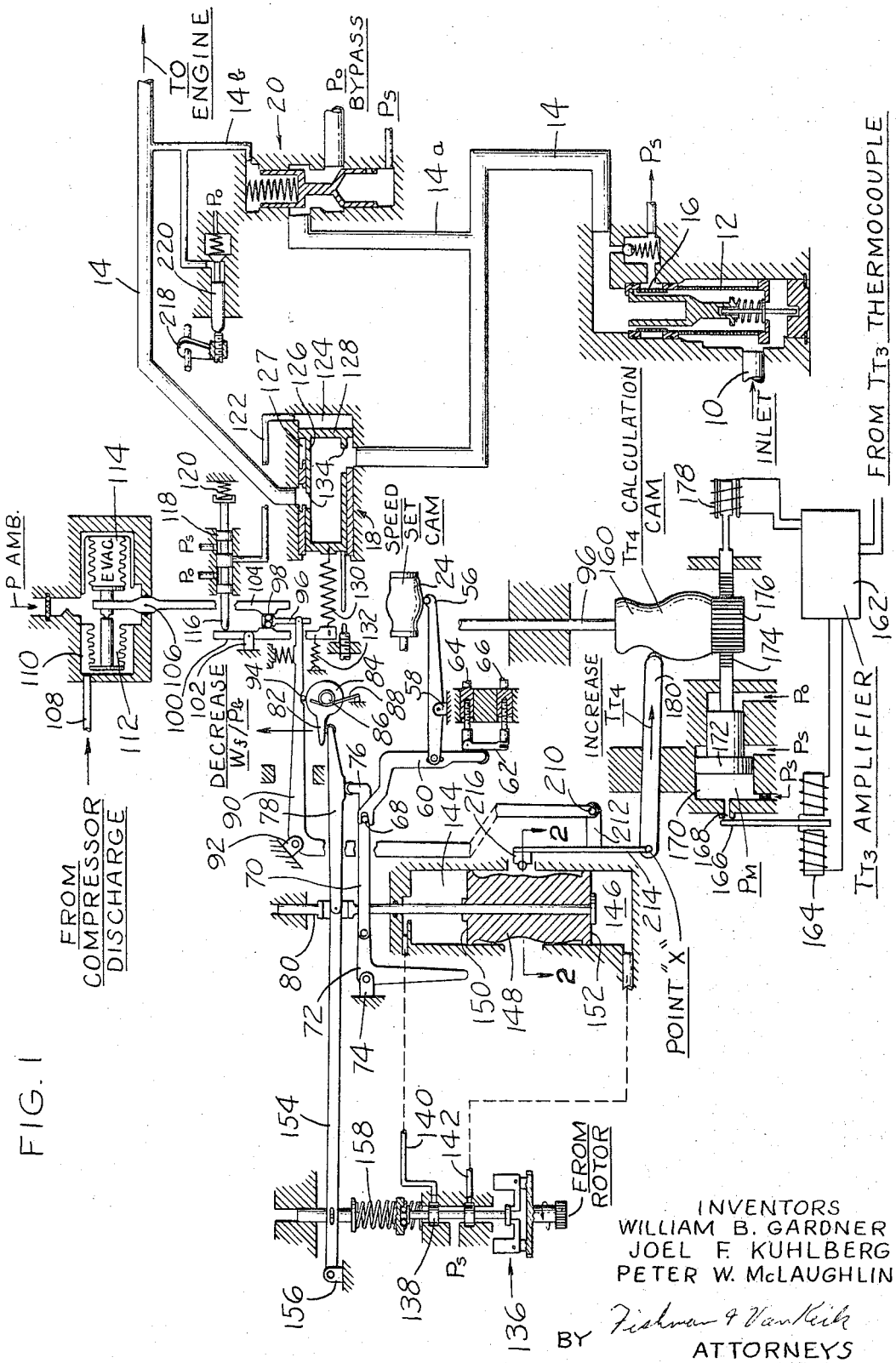
FIGURE 1 is a schematic showing of the fuel control.

The following symbols shown in the drawings and used in the specification have the indicated meanings:

Wf—Metered fuel flow
$P_B$—Engine burner pressure
$N_C$—Engine rotor speed
$T_{T2}$—Engine inlet temperature
$T_{T3}$—Burner inlet temperature
$T_{T4}$—Turbine inlet temperature
$P_S$—Unregulated servo supply pressure
$P_M$—Regulated servo pressure
$P_O$—Control bypass pressure and body pressure
$Wf/P_B$—Fuel flow unit of engine burner pressure Referring to FIGURE 1, fuel enters the fuel control through a fuel inlet 10 and passes through a filter 12 to a conduit 14. Some of the fuel passes through filter 16 and is delivered at unregulated pressure $P_S$ for use as servo fluid in the control. The fuel in conduit 14 is delivered to a metering or throttle valve 18 where it is metered and then passes further along conduit 14 to be delivered to the engine. A branch conduit 14a upstream of throttle valve 18 and a branch conduit 14b downstream thereof lead to a pressure regulating valve 20 which may bypass varying amounts of fuel from conduit 14 to maintain a desired pressure drop across throttle valve 18 in a manner well known in the art.

Referring now to FIGURES 2 and 3, a power lever shaft 22 capable of rotating about on its own axis is connected for such rotation to the pilot's power lever (not shown). An $N_C$ speed set cam 24 and a $T_{T4}$ turbine inlet temperature set cam 26 are each mounted on shaft 22 for rotation with the shaft. Speed set cam 24 is a 3D cam that is rotated in accordance with power lever angle and translated as a function of engine inlet temperature ($\approx$ compressor inlet temperature) to select or set engine speed as a function of power lever angle as biased by turbine inlet temperature. Turbine inlet temperature set cam 26 is also a 3D cam which is rotated as a function of power lever angle and translated as a function of engine inlet temperature ($\approx$ compressor inlet temperature) to provide a setting of a desired turbine inlet temperature as a function of power lever angle biased by engine inlet temperature.

Referring to FIGURE 3, part of the mechanism is shown for translating speed set cam 24 and turbine inlet set cam 26 in accordance with engine inlet temperature. A temperature sensing bulb 28 at the engine inlet is connected through a fluid filled line 30 to a fluid filled bellows 32. Changes in engine inlet temperature sensed by bulb 28 cause bellows 32 to expand and contract causing upward and downward movement of both a pivotable arm 34 in contact with a projection from bellows 32 and follower 36 riding on arm 34. Movement of follower 36 causes corresponding movement of a pivotably mounted cam 38 which in turn positions a spool valve 40. Cam 38 is mounted internally of a double ended piston 42, and movement of spool valve 40 results in a repositioning of piston 42. An increase in engine inlet temperature causes bellows 32 to expand and results in upward movement of arm 34, follower 36, cam 38 and spool valve 40. The upward movement of spool valve 40 ports unregulated servo pressure $P_S$ to a chamber 44 on the right side of piston 42 while venting a chamber 46 on the left side of piston 42 to bypass or body pressure $P_O$, thus causing a pressure unbalance across piston 42 resulting in a leftward movement of the piston. Conversely, a decrease in engine inlet temperature results in a downward movement of spool valve 40 thereby connecting chamber 46 to unregulated servo pressure $P_S$ and venting chamber 44 to $P_O$ so that piston 42 moves to the right.

Referring now to FIGURE 2, the connection from piston 42 to speed set cam 24 and turbine inlet temperature set cam 26 is shown whereby these cams are translated as a function of engine inlet temperature. An extension 48 from piston 42 carries a finger 50 which rides in a slot at the end of a rod 52, rod 52 being pivotably mounted at pivot point 54. The other end of rod 52 branches into two sections, 52a and 52b, section 52a fitting in a collar at one end of turbine inlet temperature set cam 26, and section 52b fitting into a similar collar at one end of speed set cam 24.

A speed set follower 56 is positioned in accordance with the contours on $N_C$ speed set cam 24. Speed set cam 24 and follower 56 are shown in both FIGURE 1 and FIGURE 2, and the description will now proceed with respect to the showing in FIGURE 1. Speed set follower 56 is mounted at a pivot 58 and is pivotably connected to a bell crank type rod 60. One end of bell crank 60 rests on a speed adjusting platform 62 which has setting screws 64 and 66 for idle speed adjusting and maximum speed adjusting, respectively, through which the idle and maximum speeds can be adjusted by changing the angle or slope of platform 62. A slot on the other end of bell crank rod 60 receives a finger 68 on a rod 70, one end of rod 70 being pivotably connected to a bell crank 72 which is itself mounted at a pivot 74. An extension 76 from the other end of rod 70 has a bearing or follower surface which butts against a flat surface on a link 78. One end of link 78 is pivotably connected to a slidable rod 80, and the other end of link 78 carries a bearing surface which makes contact with a finger 82 extending from a cam 84 which is mounted for rotation at pivot 86. A spring 88 biases cam 84 in the counterclockwise direction to keep finger 82 in contact with the bearing surface on the right end of link 78.

Movement of speed set cam 24, resulting from movement of the pilot lever to select an operating speed for the engine rotor, causes follower 56 to move about pivot 58 thereby moving floating bell crank 60 and causing rod 70 to pivot thereby moving extension 76 either up or down. A counterclockwise pivoting of speed set follower 56 corresponds to an increased $N_C$ setting and results in a downward movement of extension 76; a clockwise pivoting of speed set follower 56 corresponds to a decreased $N_C$ setting and results in an upward movement of extension 76. Upward or downward movement of extension 76 moves link 78 counterclockwise or clockwise, respectively, about its pivot connection to rod 80 thereby causing the bearing surface of link 78 in contact with finger 82 to move up or down respectively. Upward movement of finger 82 causes a clockwise rotation of cam 84, and downward movement of finger 82 results in a counterclockwise rotation of cam 84. As will be explained, the clockwise rotation of cam 84 leads to a decrease in fuel flow and the counterclockwise rotation of cam 84 leads to an increase in fuel flow.

A bell crank 90 mounted at a pivot 92 has a follower 94 riding on the surface of cam 84. A spring 95 urges bell crank 90 and follower 94 against cam 84. The surface of cam 84 is contoured so that clockwise rotation of the cam causes follower 94 to move upward to rotate bell crank 90 counterclockwise, while counterclockwise rotation of cam 84 causes a downward movement of follower 94 resulting in a clockwise rotation of bell crank 90. One end of bell crank 90 is pivotably connected to a rod 96 in which are mounted a pair of roller members 98. One of the rollers bears against a surface on a link 100 mounted at a pivot 102, and the other roller bears against a surface on a link 104 which is mounted at a pivot 106.

Link 104 is positioned as a function of compressor discharge pressure ($\approx$ burner pressure $P_B$). Compressor discharge pressure is delivered via conduit 108 to a chamber 110 in which is positioned a bellows 112. Compressor discharge pressure surrounds the outside of bellows 112 and loads bellows 112 against ambient pressure internally in the bellows. An evacuated bellows 114 is provided to compensate for changes in ambient pressure. Changes in compressor discharge pressure result in lever 104 being pivoted about pivot 106, an increase in compressor discharge pressure causing clockwise rotation of lever 104 and a decrease in compressor discharge pressure causing counterclockwise rotation. Movement of lever 104 in either direction changes the pressure or force with which rollers 98 bear against lever 100. One end of lever 100 contacts an extension 116 on a spool valve 118, spool valve 118 being loaded to the left against lever 100 by spring 120. A conduit 122 leads from the chamber of spool valve 118 to a chamber 124 on the right side of throttle valve 118. The throttle valve has a translatable sleeve 126 with a piston head 128 thereon mounted in chamber 124. The other end of sleeve 126 is connected via a spring 130 to an end of lever 100, lever 100 also being connected to a spring 132 which urges lever 100 against extension 116.

As mentioned previously, a change in power lever setting to call for a reduced engine rotor speed (and reduced fuel flow) results in a counterclockwise rotation of bell crank 90 and an upward movement of rod 96 and rollers 98; conversely, an increased speed setting (increased fuel flow) results in a clockwise rotation of bell crank 90 and a downward movement of rod 96 and rollers 98. Downward movement of rollers 98 increases the moment arm of the force being exerted on lever 100 through rollers 98 from lever 104 thereby causing lever 100 to pivot clockwise and move spool valve 118 to the right. The rightward movement of spool valve 118 opens conduit 122 to bypass pressure or body pressure $P_O$ thereby reducing the pressure in chamber 124. As a result of the reduced pressure in chamber 124 the fuel pressure in chamber 127 moves sleeve 126 to the right to enlarge the open area of windows 134 in sleeve 126 and thus increase the fuel flow to the engine. Spring 130 acts as a feedback mechanism to return lever 100 to a null position and thus return spool valve 118 to the null position shown in the drawings when the corrected fuel flow has been established. Conversely, a counterclockwise movement of bell crank 90 and an upward movement of rollers 98 decreases the moment arm of the force applied to lever 100 through rollers 98 from lever 104 and results in a counterclockwise movement of lever 100 and a leftward movement of spool valve 118 due to the force of spring 120. The leftward movement of spool valve 118 results in the delivery of servo supply pressure $P_S$ through conduit 122 to increase the pressure in chamber 124 and to move sleeve 118 to the left to reduce the exposed area of windows 134 and thus reduce fuel flow to the engine. Spring 130 again acts as a feedback to return lever 100 and spool valve 118 to the null positions.

From the foregoing explanation it can be seen that fuel flow through metering valve 113 is a function of selected engine rotor speed and compressor discharge pressure. The position of rollers 98 as set through bell crank 90 and the force exerted through rollers 98 from lever 104 are commensurate with a fuel flow setting as a function of desired engine speed biased by compressor discharge pressure, a relationship also expressed as fuel flow per unit of engine burner pressure. The rollers 98 are known in the art as $Wf/P_B$ rollers.

The fuel flow setting described above does not account for undesired changes in engine rotor speed. To account for such changes, a speed governor 136 is provided which is geared to the engine rotor so that it operates at a speed commensurate with the speed of the engine rotor. An increase in engine speed causes the governor flyweights to move outward thereby raising a spool valve 138 in contact with the flyweights. The upward movement of spool valve 138 results in porting of servo supply pressure $P_S$ to a conduit 140 connected to the spool valve chamber while another conduit 142 connected to the spool valve chamber is vented to $P_O$. Conduit 140 leads to a chamber 144, and conduit 142 leads to a chamber 146, chambers 144 and 146 being on opposite sides of a 3D cam 148 having piston surfaces 150 and 152 thereon. Cam 148 is mounted on slidable rod 80 so that cam 148 and rod 80 move together lineally.

The delivery of servo supply pressure $P_S$ through conduit 140 to chamber 144 and the venting of conduit 142 and chamber 146 in response to an increase in engine speed results in a downward movement of cam 148 and rod 80. Link 78 is pivotably attached to rod 80, and the downward movement of rod 80 causes link 78 to pivot counterclockwise about its contact with the bearing surface on extension 76, thereby causing an upward movement of finger 82 and a clockwise rotation of cam 84. The clockwise rotation of cam 84 acts through follower 94 to rotate bell crank 90 counterclockwise to move rod 96 and rollers 98 upward thus decreasing fuel flow, as previously described, to return engine speed to the selected value. The downward movement of rod 80 causes a clockwise rotation of a feedback link 154 which is mounted on a pivot 156. A clockwise rotation of link 154 acts through a spring 158 to return spool valve 138 to the null position.

Conversely, a decrease in engine speed results in an inward movement of the governor flyweights thus causing spool valve 138 to move downward as a result of the force of spring 158. The downward movement of spool valve 138 results in the delivery of servo supply pressure $P_S$ through conduit 142 to chamber 146 while chamber 144 is vented through conduit 140. The increased pressure in chamber 146 acts against piston 152 to move cam 148 and rod 80 upward thus causing link 78 to pivot clockwise about its contact with the bearing surface of extension 76. The clockwise rotation of link 78 causes a counterclockwise rotation of cam 84 and thus a clockwise rotation of bell crank 90. The clockwise rotation of bell crank 90 pulls rod 96 and rollers 98 downward to increase fuel flow, as previously described, to return engine speed to the selected value.

During the steady state operation of the fuel control as described above, fuel flow ratio (fuel flow per unit of engine burner pressure as represented by the position of rollers 98) is delivered to a turbine inlet temperature calculation cam 160, cam 160 being mounted on rod 96 and translating with rod 96. Cam 160 is rotated as a function of burner inlet temperature $T_{T3}$ ($\approx$ compressor discharge temperature for nonregenerative engines) so that the position of cam 160 is a combined function of fuel flow ratio and burner inlet temperature. The burner inlet temperature is sensed by thermocouples (not shown) the output of which is delivered via conductors 161 to an amplifier 162. The output from amplifier 162 is used to operate a torque motor 164 having a flapper 166 controlling the area of an orifice 168. Changes in the size of orifice 168 result in changes in pressure in a chamber 170 connected to orifice 168 and result in translation of a piston 172 in chamber 170. A rack 174 is connected to piston 172 and engages a pinion gear 176 mounted on cam 160. Movement of rack 174 results in a rotation of cam 160 as a function of burner inlet temperature. A coil feedback 178 communicates between rack 174 and amplifier 162 to deliver a feedback signal to amplifier 162 in response to movements of rack 174.

A follower rod 180 is in contact with the contoured surface of turbine inlet temperature calculation cam 160. Rod 180 is shown in both FIGURE 1 and FIGURE 2 with the direction of movement of the rod for an increasing turbine inlet temperature being as indicated. A point on the end of rod 180 is labeled point "x" in both FIGURE 1 and FIGURE 2 to facilitate interrelation between the two figures.

Referring now to the structure of FIGURE 2, a cam follower 182 is in contact with the surface of turbine inlet temperature set cam 26, follower 182 being mounted at pivot 184. Follower 182 is pivotably connected to a link 186 which has a finger 187 riding in a slot at one end of a link 188. The other end of link 188 has a slot through which it is connected at point "x" to $T_{T4}$ calculation cam follower rod 180. The midpoint of link 188 is pivotably connected to a spool valve 190 shown in the null position in FIGURE 2.

Movement of the pilot's power lever results in rotation of turbine inlet temperature set cam 26 to change the selected turbine inlet operating temperature. A setting calling for a decreased turbine inlet temperature results in counterclockwise rotation of cam follower 182 about pivot 184 to pull link 186 down and cause link 188 to rotate clockwise about the connection at point "x" to rod 180. The clockwise rotation of link 188 pulls spool valve 190 downward to allow the delivery of servo supply pressure $P_S$ to a conduit 192 which is connected to an integrating servo mechanism 194. The servo supply pressure from conduit 192 enters chamber 196 at the left of servo piston 198, and this increased pressure moves piston 198 to the right causing a counterclockwise rotation of a link 200 which is centrally mounted at pivot 202 and is connected by a slot at one end to piston 198. The other end of link 200 is connected by a slot to a link 204 which is pulled to the left by the counterclockwise rotation of link 200. The other end of link 204 is connected to the other end of the previously described bell crank 72. In this manner, the output from turbine inlet temperature set cam 26 is fed into the previously described mechanism for setting desired fuel flow. The leftward movement of link 204 causes a clockwise rotation of bell crank 72 thereby causing rod 70 to pivot counterclockwise about finger 68 and thus cause extension 76 to move link 78 upward. The upward movement of link 78, as previously described, rotates cam 84 in a clockwise direction causing an eventual decrease in fuel flow through a closing of the metering windows in throttle valve 126. The resulting upward movement of rod 96 as the mechanism moves to decrease fuel flow translates turbine inlet temperature calculation cam 160 in a direction indicating a decreased turbine inlet temperature. As a result, follower rod 180, as shown in FIGURE 1, moves to the left; as shown in FIGURE 2, follower rod 180 moves upward. As seen in FIGURE 2, the upward movement of follower rod 180 causes link 188 to rotate clockwise about its connection with link 186 thus moving spool valve 190 upward to return the spool valve to the null position.

Conversely, a pilot lever setting calling for an increased turbine inlet temperature results in a clockwise rotation of follower 182 to drive link 186 upward thereby causing link 188 to rotate counterclockwise about point "x" to move spool valve 190 upward. The upward movement of spool valve 190 vents chamber 196 to control bypass and body pressure $P_O$ so that the servo-supply pressure in a chamber 206 at the right of piston 198 moves piston 198 to the left thereby causing link 200 to rotate clockwise about pivot 202. The clockwise rotation of link 202 moves link 204 to the right thus causing bell crank 72 to rotate counterclockwse and in turn rotate rod 70 clockwise about finger 68 to lower extension 76 and thus lower link 78. The lowering of link 78 results in clockwise rotation of cam 84 to increase fuel flow as previously described. As the mechanism moves to increase fuel flow, rod 96 moves downward causing a translation of turbine inlet temperature calculation cam 160 to a position indicative of a higher turbine inlet temperature. As seen in FIGURE 1, cam follower 180 moves to the right; as seen in FIGURE 2, follower 180 moves downward. Referring to FIGURE 2, the downward movement of follower 180 rotates link 188 counterclockwise about its connection with link 186 at finger 187 thereby pulling spool valve 190 downward and returning spool valve 190 to the null position to stop the movement of piston 198.

As previously described, turbine inlet temperature calculation cam 160 is translated as a function of fuel flow ratio (fuel flow per unit of engine burner pressure) and is rotated as a function of burner inlet temperature, and the surface of cam 160 is contoured to produce an output commensurate with actual turbine inlet temperature as a function of these parameters. Point "x" on follower rod 180 (see FIGURES 1 and 2) is similarly a function of or commensurate with actual turbine inlet temperature. As seen in FIGURE 2, point 187 is commensurate with a setting of desired turbine inlet temperature as determined by the position of cam 26, and point "x" is commensurate with the actual turbine inlet temperature.

If the actual turbine inlet temperature deviates from the desired turbine inlet temperature, link 188 is caused to rotate about point 187, the rotation of link 188 being counterclockwise if rod 180 and point "x" move downward in response to an increase in turbine inlet temperature, and the rotation of link 188 being clockwise about point 187 if rod 180 and point "x" move upward in response to an increasce in actual turbine inlet temperature. An upward movement of rod 180 and point "x" in response to a decrease in actual turbine input temperature moves spool valve 190 upward to vent chamber 196 to control bypass pressure via conduit 192. Piston 198 is thus caused to move to the right and acts through link 200, 204, bell crank 72, rod 70, link 78 and cam 84 to increase the fuel flow and thus increase turbine inlet temperature. As the increased fuel flow results in an increased turbine inlet temperature, rod 180 and point "x" (as seen in FIGURE 2) move downward, and spool valve 190 is returned to the null position as actual turbine inlet temperature equalizes with the selected turbine inlet temperature.

Conversely, if actual turbine inlet temperature should increase beyond the desired turbine inlet temperature, follower rod 180 and point "x" (as seen in FIGURE 2) would move downward causing a counterclockwise rotation of link 188 about point 187 to pull spool valve 190 downward. The downward movement of spool valve 190 ports servo supply pressure to chamber 196 thus moving piston 198 to the right, the rightward movement of piston 198 acting through link 200, link 204, bell crank 72, rod 70, link 78 and cam 84 to decrease fuel flow as previously described. The decrease in fuel flow resets the position of turbine inlet temperature calculation cam 160 so that follower rod 180 and point "x" (as seen in FIGURE 2) move upward as actual turbine inlet temperature decreases to the selected value as indicated by the position of point 187. The upward movement of rod 180 and point "x" returns spool valve 190 to the null position to end the movement of piston 198.

Servo mechanism 194 with the inputs from points "x" and 187 and with the feedback from rod 96 and cam 160 is a closed loop integrating servo, the output of which acts through the linkage mechanism as described to trim the engine speed setting from cam 24 as reflected in the linkage settings and the position of rollers 98 and rod 96. The integral gain from servo 194 in response to temperature errors is given only the limited authority required to correct the fuel flow governing system for any given set of engine operating conditions. Accordingly, the limited authority of the integral gain permits satisfactory engine operation through the action of the remainder of the fuel control in the event of a failure in the integrating circuit.

As can be understood from the foregoing description of steady state operation of the fuel control, steady state fuel flow is established as a combined function of compressor discharge ($P_B$), selected engine rotor speed, also referred to as compressor speed ($N_C$), and selected turbine inlet temperature ($T_{T4}$). Actual rotor speed is sensed; and actual turbine inlet temperature is calculated by measurement of fuel flow per unit of engine burner pressure ($wf/P_B$) and burner inlet temperature. Deviations of engine rotor speed and/or turbine inlet temperature from the selected values of each are sensed by comparing the actual values of each with the selected values, and fuel flow is adjusted to compensate for deviations. That is, fuel flow is regulated to maintain the selected values of engine rotor speed and turbine inlet temperature. Through the inputs of selected speed and actual speed to link 78, it can be said that the position of the bearing surface on the right end of link 78 is a function of speed error. Similarly, the output from servo 194 is a function of turbine inlet temperature error, and thus the input to link 78 from servo 194 can be said to trim the speed or speed error setting as a function of turbine inlet temperature error.

The control is also provided with an acceleration limiting capacity. Cam 148 is a 3D cam translated as a function of engine rotor speed ($N_C$) and rotated as a function of engine inlet temperature. Translation as a function of rotor speed has been described above. Cam 148 is shown in both FIGURE 1 and FIGURE 2, the view in FIGURE 2 showing that piston 42 is connected through a gear rack 208 to rotate cam 148. Since the position of piston 42 has been previously described as being a function of engine inlet temperature, it can be seen that cam 148 is rotated as a function of engine inlet temperature. The surface of cam 148 is contoured as a function of maximum permissible turbine inlet temperature for any given combination of rotor speed and engine inlet temperatures.

The bottom arm 90a of bell crank 90 is pivotably connected at pivot 210 to an extension 212 from a link 214. Link 214 is pivotally connected at one end to turbine inlet temperature calculation cam follower rod 180. The other end of link 214 carries a contact or bearing member 216 for contact with the surface of cam 148 for acceleration limiting. The position of pivot point 210 for link 214 is determined by the position of bell crank 90, and hence is related to engine fuel flow settings. During engine acceleration, rod 96 and cam 160 will be moving downward for increasing fuel flow, and follower 180 (as seen in FIGURE 1) will move to the right. This movement of follower 180 causes link 214 to pivot counterclockwise about pivot point 210 and brings member 216 into contact with the surface of cam 148. When member 216 contacts cam 148, movement of bell crank 90 is restricted by the contour of cam 148. Thus, regardless of the rotation of cam 84 in a direction calling for increased fuel flow, motion of bell crank 90 will be regulated by cam 148 with cam 84 rotating counterclockwise and losing contact with follower 94. Movement of rod 96 to increase fuel flow is thus restricted in accordance with maximum permissible turbine inlet temperature as determined by engine rotor speed and engine inlet temperature. Actual turbine inlet temperature is compared with the permissible maximum to determine when acceleration limiting must occur.

On engine shutdown a lever 218 moves a shutoff spool valve 220 to the right to open line 14b to bypass pressure P_o. This low pressure in line 14b results in the full opening of bypass valve 20 so that fuel is recirculated rather than being delivered to metering valve 18.

It will be understood by those skilled in the art that various refinements and sophistications can be included in this control. For example, a temperature compensation feature could be added to the temperature sensor of FIGURE 3, a sweep system could be used with valves, and spool valves could be rotated from a common gear drive to assure against binding. Also it will be understood that a minimum pressurizing valve could be added in conduit 14 downstream of the connection with branch 14b, and that this pressurizing valve could be driven closed by porting servo supply pressure to it on moving shutoff valve 220 to the right.

While a preferred embodiment of the present invention has been shown and described, various modifications and substitutions may be made without departing from the spirit and scope of this invention. Accordingly, it is to be understood that this invention has been described by way of illustration rather than limitation.

What is claimed is:

1. A fuel control for a gas turbine engine having a rotor with a compressor connected to a turbine and a burner section between the compressor and the turbine, the control comprising:
   metering means for metering fuel flow to said engine;
   speed selecting means for selecting a desired operating speed of said rotor, said speed selecting means being functionally connected to said metering means;
   speed sensing means for sensing the actual speed of said rotor;
   means responsive to said speed sensing means and functionally connected to said metering means for modifying fuel flow in response to deviations of engine speed from the selected desired speed;
   temperature selecting means for selecting a desired temperature at the inlet to the turbine, said temperature selecting means being functionally connected to said metering means;
   means for sensing a plurality of engine parameters;
   calculating means functionally connected to said means for sensing a plurality of engine parameters for calculating the actual temperature at the inlet to said turbine; and
   means responsive to said calculating means and functionally connected to said metering means for modifying fuel flow in response to deviations in turbine inlet temperature from the selected desired turbine inlet temperature.

2. A fuel control for a gas turbine engine as in claim 1 including:
   means for sensing pressure at the discharge of said compressor; and
   means functionally connecting said compressor discharge pressure sensing means to said metering means to meter fuel flow in accordance with compressor discharge pressure.

3. A fuel control for a gas turbine engine as in claim 1 wherein said means for sensing a plurality of engine parameters includes pressure sensing means for sensing compressor discharge pressure and temperature sensing mean for sensing burner inlet temperature, and including means for generating a signal commensurate with fuel flow to the engine per unit of engine burner pressure, said calculating means being responsive to burner inlet temperature and to said signal.

4. A fuel control for a gas turbine engine as in claim 1 including:
   acceleration limiting means;
   means connecting said speed sensing means to said acceleration limiting means to regulate said acceleration limiting means as a function of rotor speed;
   temperature sensing means for sensing engine inlet temperature;
   means functionally connecting said engine inlet temperature sensing means to said acceleration limiting means to regulate said acceleration limiting means as a function of engine inlet temperature; and
   means actuated by said calculating means and intermittently responsive to said acceleration limiting means for limiting fuel flow to said engine during engine acceleration.

5. A fuel control for a gas turbine engine as in claim 1 including:
   temperature sensing means for sensing engine inlet temperature; and
   means responsive to said engine inlet temperature sensing means for biasing at least one of said speed selecting means and said temperature selecting means.

6. A fuel control for a gas turbine engine as in claim 1 wherein said means responsive to said calculating means includes a closed loop integrating servo mechanism.

7. A fuel control for a gas turbine engine having a rotor with a compressor connected to a turbine and a burner section between the compressor and the turbine, the control comprising:
   metering means for metering fuel flow to said engine;
   speed selecting means for selecting a desired operating speed of said rotor, said speed selecting means being functionally connected to said metering means;
   speed sensing means for sensing the actual speed of said rotor;
   means responsive to said speed sensing means and functionally connected to said metering means for modifying fuel flow in response to deviations of engine speed from the selected desired speed;
   temperature selecting means for selecting a desired temperature at the inlet to said turbine, said temperature selecting means being functionally connected to said metering means;
   pressure sensing means for sensing compressor discharge pressure;
   means functionally connecting said pressure sensing means to said metering means;
   signal generating means responsive to said speed selecting means, said temperature selecting means and said pressure sensing means for generating a signal commensurate with fuel flow to said engine per unit of engine burner pressure;
   temperature sensing means for sensing temperature at the entrance to said burner section;
   calculating means responsive to said signal generating means and to said temperature sensing means for calculating actual turbine inlet temperature; and
   means responsive to said calculating means and functionally connected to said metering means for modifying fuel flow in response to deviation in turbine inlet temperature from the selected desired turbine inlet temperature.

8. A fuel control for a gas turbine engine as in claim 7 including:
   acceleration limiting means;
   means connecting said speed sensing means to said acceleration limiting means to regulate said acceleration limiting means as a function of rotor speed;
   temperature sensing means for sensing engine inlet temperature;
   means functionally connecting said engine inlet temperature sensing means to said acceleration limiting means to regulate said acceleration limiting means as a function of engine inlet temperature; and means actuated by said calculating means and intermittently responsive to said acceleration limiting means for limiting fuel flow to said engine during engine acceleration.

9. A fuel control for a gas turbine engine as in claim 7 including:
   temperature sensing means for sensing engine inlet temperature; and
   means responsive to said engine inlet temperature sensing means for biasing at least one of said speed selecting means and said temperature selecting means.

10. A fuel control for a gas turbine engine as in claim 7 wherein said means responsive to said calculating means includes a closed loop integrating servo mechanism.

References Cited
UNITED STATES PATENTS

| | | | |
|---|---|---|---|
| 2,960,826 | 11/1960 | Hall et al. | 60—39.28 |
| 3,129,643 | 4/1964 | Porter et al. | 60—39.28 X |

JULIUS E. WEST, *Primary Examiner.*